Patented May 11, 1937

2,080,051

UNITED STATES PATENT OFFICE 2,080,051

MANUFACTURE OF ARTICLES FROM PLASTIC MATERIALS

Alfred Dominique Germain Landucci, Paris, France, assignor, by mesne assignments, to Eastman Kodak Company, Jersey City, N. J., a corporation of New Jersey No Drawing. Application March 15, 1935, Serial No. 11,316. In France December 13, 1934

15 Claims. (Cl. 18—57)

The present invention relates to the manufacture of articles such as films, threads, bands and the like from plastic materials such as colloidal bodies, derivatives of cellulose, resins, rubbers, gums, gelatines and the like.

The usual process in the manufacture of such bodies consists in dissolving the starting material in a liquid so as to give either a true solution or a dispersion or emulsion and adding to this if desired other substances having properties required in the final product. In this way a composition is obtained which can be shaped to give the form of the article desired, for instance, by spreading or extruding it on to a solid surface or support of the required shape. The next step consists in subjecting the composition to the action of a gas or liquid which extracts the solvent or dispersion medium and leaves a solid article having the same shape as that imparted to the fluid composition. The article can then be removed from the support and dried if necessary.

It is a disadvantage of such a process that not only is the time of coagulation undesirably long, but it is also necessary to keep the temperature of the composition below a certain value because otherwise bubbles will be formed and there will be a tendency for the precipitated solid to revert to the disperse phase. It has for this reason not hitherto proved possible to reduce the time required for coagulation by raising the temperature of the substances concerned.

According to the present invention the solidification of the fluid composition is accelerated in one of two ways according as a gaseous or liquid extraction agent is used. In the case of a gaseous extraction agent, the support is cooled to maintain it at a temperature considerably below that of the extraction agent, while in the case of a liquid extraction agent the support is heated to maintain it at a temperature considerably above that of the extraction agent.

The invention is particularly applicable to processes in which filling or other materials are to be incorporated in the article to be produced, provided only that these substances have a higher boiling point than the solvent used. The substances in question may be added at a stage in the process before the fluid composition is spread on the support or alternatively the substance or substances may constitute or be incorporated in the extraction agent, in which case they will be absorbed by the composition when they are brought in contact with it.

It is believed that a possible explanation of the phenomena underlying the present process is as follows:—

At a given temperature the composition spread on the solid support remains in its initial state so long as it contains a certain proportion of solvent but instability occurs as soon as this proportion of solvent is decreased, whether the decrease be effected by extraction or as the result of absorption by the composition of a substance or substances which do not exert solvent action. When the equilibrium is disturbed in this way spontaneous solidification, i. e. coagulation or precipitation occurs. Now it has been found that if the temperature of the support carrying the composition is lowered at the same time as the solvent extraction is being carried out by a gaseous extraction agent, the non-solvent substances tend to collect in that part of the composition in contact with the chilled support. This results in a still further increase in the proportion of non-solvent substances in this region which consequently coagulates even more quickly than the regions remote from the surface of the support. The article can therefore be removed from the support all the more quickly and this has the important practical advantage of reducing the time for which a particular piece of apparatus is being used to produce an article and consequently results in an increase of the output of the apparatus. This effect can be made even more marked if the temperature of the extraction agent be raised, because the rate of extraction of the solvent will then be increased.

The result of heating the support when a liquid extraction agent is used is to drive the solvent away from those regions of the composition in contact with it, that is to say towards those regions in contact with the extraction agent and since the affinity of the liquid extraction agent for the solvent is considerably greater at a low temperature there will be a marked increase in the rate of absorption of solvent. The non-solvent substances will in this case tend to collect in that part of the composition in contact with the extraction agent and with this procedure coagulation will begin in this region and will then proceed towards the region in contact with the support. The advantage of cooling the liquid extraction agent and heating the support lies principally in the fact that it effects a rapid removal of solvent and consequently there is less tendency for the extraction agent to be absorbed by the composition more quickly than the solvent is removed, so that the product according to this process contains less non-solvent materials than the product of processes at present in use.

It is important to notice that the power of the solvent to maintain the equilibrium of the composition increases with increasing temperature and consequently it is essential that either the support or the extraction agent, as the case may be, should be at a temperature below the limiting temperature at which the coagulated composition tends to revert to its initial state. This limiting temperature naturally varies according to the nature of the composition used.

In order that the invention may be more clearly understood and carried into effect some examples of its use will now be given.

Example I

A composition consisting of a colloidal solution of cellulose acetate in a mixture of 80 parts of methylene chloride (the solvent) and 20 parts of ethyl alcohol (a non-solvent) is spread on a chilled surface maintained at a temperature of 15° C. by means of a water jacket or otherwise. Air heated to 80–100° C. is then passed over the composition. After 5 or 6 minutes the composition has solidified sufficiently to be detachable from the support. With the processes at present in use the temperature of the heated air could not have exceeded about 50° C. and the composition would not have solidified sufficiently for removal in less than 15 minutes.

Example II

A composition consisting of divinyl formal dissolved in a mixture of 90 parts of methylene chloride (the actual solvent) and 10 parts of ethyl alcohol is spread on a support cooled to 15° C. and air at a temperature of 80–120° C. is then passed over the composition. After five or six minutes the composition has solidified sufficiently to enable it to be removed from the support. If the support had not been cooled it would not have been possible to heat the air to a temperature higher than 30° C. without the risk of the formation of bubbles and in this case the time of solidification would probably be of the order of several hours.

Example III

A colloidal solution of nitro-cellulose in methyl alcohol is spread on a drum immersed in a vessel containing water cooled to about 4° C. The drum is heated by circulating hot oil or otherwise to a temperature of about 50° C. The composition solidifies in less than 1 minute and the film thus formed can be removed from the drum. The decrease of time required for coagulation is very marked in this case.

In some cases, in order to avoid any irregularity in the articles produced caused by too sudden a solidification, it may be desirable to avoid subjecting the composition to a sudden change of temperature such as would be experienced if it were spread on the support which had previously been cooled or heated to the desired temperature. In such cases the support is maintained at a temperature approximately equal to that of the composition while it is being spread on the support, which is then raised or lowered to the desired temperature. When a gaseous extraction agent is being used it is convenient for this purpose to use a spreading machine having an endless band because it is easier to regulate the temperature at different points along the band with a machine of this type than with a machine of the drum variety.

I claim:—

1. In the method of making plastic articles such as films, bands, threads and the like by depositing a solution of plastic material containing a solvent and a non-solvent on a suitable forming surface and coagulating the material by removing the solvent and non-solvent by an extracting agent, the step which comprises accelerating coagulation by bringing about a localization of non-solvent in that portion of the plastic material immediately adjacent to the forming surface by maintaining a wide differential of temperature between the forming surface and the extracting agent.

2. In the method of making plastic articles such as films, bands, threads and the like by depositing a solution of the plastic material containing a solvent and a non-solvent on a suitable forming surface and coagulating the material by removing the solvent and non-solvent by an extracting agent, the step which comprises accelerating coagulation by bringing about a localization of non-solvent in that portion of the plastic material immediately adjacent to the forming surface by cooling the forming surface and simultaneously heating the extracting agent to a temperature considerably above that of the forming surface.

3. In the method of making plastic articles such as films, bands, threads and the like by depositing a solution of the plastic material containing a solvent and a non-solvent on a suitable forming surface and coagulating the material by removing the solvent and non-solvent by an extracting agent, the step which comprises accelerating coagulation by bringing about a localization of non-solvent in that portion of the plastic material immediately adjacent to the forming surface by heating the forming surface and simultaneously cooling the extracting agent to a temperature considerably below that of the forming surface.

4. In the method of making sheets or films by depositing a solution of a cellulose derivative containing a solvent and a non-solvent on a film-forming surface and coagulating the material by removing the solvent and non-solvent by an extracting agent, the step which comprises accelerating coagulation by bringing about a localization of non-solvent in that portion of the film immediately adjacent to the film-forming surface by maintaining a wide differential of temperature between the film-forming surface and the extracting agent.

5. In the method of making sheets or films by depositing a solution of a cellulose derivative containing a solvent and a non-solvent on a film-forming surface and coagulating the material by removing the solvent and non-solvent by an extracting agent, the step which comprises accelerating coagulation by bringing about a localization of non-solvent in that portion of the film immediately adjacent to the film-forming surface by cooling the film-forming surface and simultaneously heating the extracting agent to a temperature considerably above that of the film-forming surface.

6. In the method of making sheets or films by depositing a solution of a cellulose derivative containing a solvent and a non-solvent on a film-forming surface and coagulating the material by removing the solvent and non-solvent by an extracting agent, the step which comprises accelerating coagulation by bringing about a localization of non-solvent in that portion of the film immediately adjacent to the film-forming surface by heating the film-forming surface and simultaneously cooling the extracting agent to a temperature considerably below that of the film-forming surface.

7. In the method of making sheets or films by depositing a solution of a cellulose derivative containing a solvent and a non-solvent on a film-forming surface and coagulating the material by removing the solvent and non-solvent by a gaseous extracting agent, the step which comprises accelerating coagulation by bringing about a localization of non-solvent in that portion of the film immediately adjacent to the film-forming surface by cooling the film-forming surface and simultaneously heating the gaseous extracting agent to a temperature considerably above that of the film-forming surface.

8. In the method of making sheets or films by depositing a solution of a cellulose derivative containing a solvent and a non-solvent on a film-forming surface and coagulating the material by removing the solvent and non-solvent by a liquid extracting agent, the step which comprises accelerating coagulation by bringing about a localization of non-solvent in that portion of the film immediately adjacent to the film-forming surface by heating the surface and simultaneously cooling the extracting agent considerably below that of the film-forming surface.

9. In the method of making sheets or films by depositing a solution of a cellulose organic ester containing a solvent and a non-solvent on a film-forming surface and coagulating the material by removing the solvent and non-solvent by a gaseous extracting agent, the step which comprises accelerating coagulation by bringing about a localization of non-solvent in that portion of the film immediately adjacent to the film-forming surface by cooling the film-forming surface and simultaneously heating the air to a temperature considerably above that of the film-forming surface.

10. In the method of making sheets or films by depositing a solution of cellulose acetate containing a solvent and a non-solvent on a suitable film-forming surface and coagulating the material by removing the solvent and non-solvent by heated air, the step which comprises accelerating coagulation by bringing about a localization of non-solvent in that portion of the plastic material immediately adjacent to the film-forming surface by cooling the film-forming surface and simultaneously heating the air to a temperature considerably above that of the film-forming surface.

11. In the method of making sheets or films by depositing a solution of cellulose acetate containing a solvent and non-solvent on a film-forming surface and coagulating the material by removing the solvent and non-solvent by means of heated air, the step which comprises accelerating coagulation by cooling the film-forming surface to a temperature of about 15° C. and simultaneously heating the air to a temperature of 80–100° C.

12. In the method of making sheets or films by depositing a solution of cellulose nitrate containing a solvent and non-solvent on a film-forming surface and coagulating the material by removing the solvent and non-solvent by means of water, the step which comprises accelerating coagulation by bringing about a localization of non-solvent in that portion of the film immediately adjacent to the film-forming surface by heating the surface to a temperature of about 50° C. and simultaneously cooling the water to about 4° C.

13. In the method of making sheets or films by depositing a solution of a resin containing a solvent and a non-solvent on a film-forming surface and coagulating the material by removing the solvent and non-solvent by means of heated air, the step which comprises accelerating coagulation by cooling the film-forming surface and simultaneously heating the air to a temperature considerably above that of the film-forming surface.

14. In the method of making sheets or films by depositing a solution of a resin containing a solvent and a non-solvent on a film forming surface and coagulating the material by removing the solvent and non-solvent by means of heated air, the step which comprises accelerating coagulation by cooling the film-forming surface to a temperature of about 15° C. and simultaneously heating the air to a temperature of 80–120° C.

15. In the method of making sheets or films by depositing a solution of divinyl formal in a mixture of methylene chloride and alcohol on a film-forming surface and coagulating the material by removing the methylene chloride and alcohol by means of heated air, the step which comprises accelerating coagulation by cooling the film-forming surface to a temperature of about 15° C. and simultaneously heating the air to a temperature of 80–120° C.

ALFRED DOMINIQUE GERMAIN LANDUCCI.